(12) United States Patent
Yli-Rantala et al.

(10) Patent No.: US 12,333,079 B2
(45) Date of Patent: Jun. 17, 2025

(54) SURFACE AUDIO DEVICE WITH HAPTIC OR AUDIO FEEDBACK

(71) Applicant: PS Audio Design Oy, Oulu (FI)

(72) Inventors: Eero Yli-Rantala, Lapua (FI); Vesa Kajanus, Oulunsalo (FI); Petteri Luukkanen, Tupos (FI); Mika Lammassaari, Kiviniemi (FI)

(73) Assignee: PS AUDIO DESIGN OY, Oulu (FI)

( * ) Notice: Subject to any disclaimer, the term of this patent is extended or adjusted under 35 U.S.C. 154(b) by 0 days.

(21) Appl. No.: 18/566,833

(22) PCT Filed: Jun. 9, 2022

(86) PCT No.: PCT/FI2022/050397
§ 371 (c)(1),
(2) Date: Dec. 4, 2023

(87) PCT Pub. No.: WO2022/258886
PCT Pub. Date: Dec. 15, 2022

(65) Prior Publication Data
US 2024/0201785 A1    Jun. 20, 2024

(30) Foreign Application Priority Data
Jun. 10, 2021 (FI) ..................... 20215680

(51) Int. Cl.
*G06F 3/01* (2006.01)
*B06B 1/04* (2006.01)
(Continued)

(52) U.S. Cl.
CPC .............. *G06F 3/016* (2013.01); *B06B 1/045* (2013.01); *G06F 3/046* (2013.01); *G06F 3/165* (2013.01)

(58) Field of Classification Search
CPC ...... G06F 3/041–047; G06F 2203/041–04114; G06F 3/016;
(Continued)

(56) References Cited

U.S. PATENT DOCUMENTS

2010/0302199 A1* 12/2010 Taylor ..................... G06F 3/046
345/174
2011/0167391 A1* 7/2011 Momeyer ............... G06F 3/038
715/863
(Continued)

FOREIGN PATENT DOCUMENTS

EP 0370963 A1 5/1990
EP 3257591 A1 12/2017
(Continued)

OTHER PUBLICATIONS

WO-2020161894-A1 (Year: 2020).*
(Continued)

*Primary Examiner* — Sanjiv D. Patel
(74) *Attorney, Agent, or Firm* — Christopher R. Carroll; The Small Patent Law Group LLC

(57) ABSTRACT

Various example embodiments relate to providing audio or haptic feedback to a user. An apparatus may comprise: detection circuitry coupled to a first coil, wherein the detection circuitry is configured to detect a user input on a surface based on a triggering signal comprising voltage or current induced at the first coil by displacement of the surface by a user. The apparatus may further comprise feedback circuitry coupled to a second coil, wherein the feedback circuitry is configured to activate a feedback signal in response to detection of the user input by the detection circuitry, and wherein the second coil is configured to cause or alter movement of the surface based on a magnetic field configured to be generated by the second coil upon activation of
(Continued)

the feedback signal. Apparatuses, methods, and computer programs are disclosed.

20 Claims, 7 Drawing Sheets

(51) Int. Cl.
*G06F 3/046* (2006.01)
*G06F 3/16* (2006.01)

(58) Field of Classification Search
CPC .. G06F 3/04883; G06F 3/0488; G06F 3/0412; G06F 3/167; G06F 3/014; G06F 1/1626; G06F 2203/014; G06F 3/03547; G06F 3/0416; G06F 3/046; B06B 1/045; B06B 2201/53; B06B 1/0261; B06B 1/0207; B06B 1/04; B06B 2201/58; B06B 1/08
See application file for complete search history.

(56) References Cited

U.S. PATENT DOCUMENTS

| | | |
|---|---|---|
| 2014/0049514 A1 | 2/2014 | Furukawa et al. |
| 2016/0004311 A1* | 1/2016 | Yliaho .................... G06F 3/165 381/99 |
| 2018/0090253 A1* | 3/2018 | Songatikamas ....... G06F 3/0416 |
| 2019/0004606 A1* | 1/2019 | Billington .............. G06F 3/016 |
| 2020/0387224 A1 | 12/2020 | Das et al. |
| 2022/0365617 A1* | 11/2022 | Araya ...................... G06F 3/02 |

FOREIGN PATENT DOCUMENTS

| | | | |
|---|---|---|---|
| EP | 3603110 A1 | 2/2020 | |
| WO | WO-2020161894 A1 * | 8/2020 | ............. G06F 3/016 |

OTHER PUBLICATIONS

Office action mailed Dec. 11, 2021 for corresponding FI patent application No. 20215680 (9 pages).
Search report mailed Dec. 11, 2021 for corresponding FI patent application No. 20215680 (2 pages).
Notification ISA206 mailed Sep. 9, 2022 for corresponding application No. PCT/FI2022/050397 (14 pages).
ISR mailed Aug. 12, 2022 for corresponding application No. PCT/FI2022/050397 (8 pages).
Written opinion of ISA mailed Aug. 12, 2022 for corresponding application No. PCT/FI2022/050397 ( pages).
Culbertson Heather et al. "Refined methods for creating realistic haptic virtual textures from tool-mediated contact acceleration data" Haptics Symposium Mar. 4, 2012 IEEE.

* cited by examiner

SURFACE AUDIO DEVICE WITH HAPTIC OR AUDIO FEEDBACK

CROSS-REFERENCE TO RELATED APPLICATIONS

This application is a national phase entry of and claims priority to International Patent Application No. PCT/FI2022/050397 (filed 9 Jun. 2022), which claims priority to Finnish Patent Application No. 20215680 (filed 10 Jun. 2021), the entire disclosures of which are incorporated herein by reference.

TECHNICAL FIELD

Various example embodiments generally relate to the field of providing audio or haptic feedback to a user. Some example embodiments relate to transducers, such as loudspeakers, configured to convert electrical energy into vibration and additionally configured to operate as a user input device.

BACKGROUND

Transducers may convert energy from one form to another and may be applied in various type of devices such as loudspeakers to produce sounds based on electric signals. In general, a loudspeaker may comprise a surface that is caused to vibrate according to the electric signal to produce the sound. In surface audio devices, a surface such as for example a display of a mobile phone, a screen of a television, a panel inside a vehicle, may be configured as a surface for generating a sound. Sounds may be used to provide audio feedback to a user. Furthermore, vibrations may be used to provide haptic or tactile feedback to the user.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. The scope of protection sought for various embodiments of the present disclosure is set out by the independent claims.

Example embodiments of the present disclosure enable using a surface audio device for receiving a user input and improving user experience by providing audio or haptic feedback to the user input. These and other benefits may be achieved by the features of the independent claims. Further advantageous implementation forms are provided in the dependent claims, the description, and the drawings.

According to a first aspect, an apparatus may comprise: detection circuitry coupled to a first coil, wherein the detection circuitry is configured to detect a user input on a surface based on a triggering signal comprising voltage or current induced at the first coil by displacement of the surface by a user: and feedback circuitry coupled to a second coil, wherein the feedback circuitry is configured to activate a feedback signal in response to detection of the user input by the detection circuitry, and wherein the second coil is configured to cause or alter movement of the surface based on a magnetic field configured to be generated by the second coil upon activation of the feedback signal.

According to an example embodiment of the first aspect, the apparatus may further comprise: at least one magnetic element, wherein the displacement of the surface is configured to cause relative movement between the at least one magnetic element and the first coil to induce the voltage or current at the first coil.

According to an example embodiment of the first aspect, the apparatus may further comprise: a top portion comprising a first magnetic element and a base portion comprising the first coil and the second coil. The displacement of the surface by the user may be configured to cause movement of the top portion towards the base portion.

According to an example embodiment of the first aspect, the first coil and the second coil may be substantially concentric and have substantially same diameter. The first coil may be located closer to the top portion than the second coil.

According to an example embodiment of the first aspect, the base portion may further comprise at least one second magnetic element. At least part of the first coil and/or at least part of the second coil may be configured to encircle the at least one second magnetic element.

According to an example embodiment of the first aspect, a resistance of the first coil may be between 22-26 ohms. A length of a wire of the first coil may be between 3.8-4.2 m.

According to an example embodiment of the first aspect, at least part of the at least one second magnetic element may be configured to encircle the first coil. At least part of the second coil may be configured to encircle the at least one second magnetic element.

According to an example embodiment of the first aspect, a resistance of the first coil may be between 29-33 ohms. A length of a wire of the first coil may be between 4.8-5.2 m.

According to an example embodiment of the first aspect, at least one of the first magnetic element and the second magnetic element may comprise a permanent magnet.

According to an example embodiment of the first aspect, the first magnetic element or the second magnetic element may comprise a magnetizable element.

According to an example embodiment of the first aspect, the feedback signal may comprise a DC voltage or a DC current.

According to an example embodiment of the first aspect, the apparatus may further comprise: a low-pass filter configured to filter the triggering signal. The low-pass filter may be configured to pass haptic frequencies and suppress audio frequencies.

According to an example embodiment of the first aspect, a cut-off frequency of the low-pass filter may be between 8-12 Hz.

According to an example embodiment of the first aspect, the detection circuitry may be further configured to: provide a first indication of the user input, in response to detecting a peak of the triggering signal: and/or provide a second indication of the user input, in response to detecting a zero-crossing of the triggering signal after the peak of the triggering signal.

According to an example embodiment of the first aspect, the detection circuitry may be further configured to: derivate the triggering signal to obtain a derivative of the triggering signal: and provide the first indication of the user input in response to detecting the triggering signal to be above zero and the derivative of the triggering signal to be substantially equal to zero.

According to an example embodiment of the first aspect, the detection circuitry may be further configured to: integrate the triggering signal: and provide a third indication of the user input, in response to detecting the integrated triggering signal to reach or exceed a first threshold and the triggering signal to be above zero.

According to an example embodiment of the first aspect, the detection circuitry may be further configured to: trigger the feedback circuitry to activate the feedback signal in response to at least one of: the first indication of the user input, the second indication of the user input, or the third indication of the user input.

According to an example embodiment of the first aspect, the detection circuitry may be further configured to: calibrate a zero level of the triggering signal based on an idle voltage of the first coil.

According to an example embodiment of the first aspect, the detection circuitry may be further configured to: activate detection of the user input, in response to detecting the triggering signal to reach or exceed a second threshold.

According to an example embodiment of the first aspect, the detection circuitry may be coupled to a plurality of the first coils. The detection circuitry may be further configured to detect the user input on the surface based on a plurality of triggering signals corresponding to the plurality of the first coils. The feedback circuitry may be further configured to activate a plurality of the feedback signals for the plurality of the first coils, in response to the detection of the user input by the detection circuitry.

According to an example embodiment of the first aspect, the detection circuitry may be further configured to detect a location of the user input at the surface based on voltage or current levels induced by the user input at the plurality of the first coils.

According to an example embodiment of the first aspect, the feedback circuitry may be further configured to determine the plurality of the feedback signals based on the location of the user input at the surface.

According to an example embodiment of the first aspect, the feedback circuitry may be further configured to determine the plurality of the feedback signals based on a mapping between the location of the user input at the surface and at least one feedback signal.

According to an example embodiment of the first aspect, the feedback circuitry may be further configured to receive an indication of the mapping between the location of the user input at the surface and the at least one feedback signal.

According to an example embodiment of the first aspect, the plurality of feedback signals may be identical.

According to a second aspect, a method may comprise: detecting a user input on a surface based on a triggering signal comprising a voltage or current induced at a first coil by displacement of the surface by a user: activating a feedback signal, in response to detection of the user input: and generating a magnetic field by a second coil to cause or alter movement of the surface, in response to activation of the feedback signal.

According to an example embodiment of the second aspect, the feedback signal may comprise a DC voltage or a DC current.

According to an example embodiment of the second aspect, the method may further comprise: filtering the triggering signal with a low-pass filter configured to pass haptic frequencies and suppress audio frequencies.

According to an example embodiment of the second aspect, a cut-off frequency of the low-pass filter may be between 8-12 Hz.

According to an example embodiment of the second aspect, the method may further comprise: providing a first indication of the user input, in response to detecting a peak of the triggering signal: and/or providing a second indication of the user input, in response to detecting a zero-crossing of the triggering signal after the peak of the triggering signal.

According to an example embodiment of the second aspect, the method may further comprise: derivating the triggering signal to obtain a derivative of the triggering signal: and providing the first indication of the user input, in response to detecting the triggering signal to be above zero and the derivative of the triggering signal to be substantially equal to zero.

According to an example embodiment of the second aspect, the method may further comprise: integrating the triggering signal: and providing a third indication of the user input, in response to detecting the integrated triggering signal to reach or exceed a first threshold and the triggering signal to be above zero.

According to an example embodiment of the second aspect, the method may further comprise: triggering a feedback circuitry to activate the feedback signal in response to at least one of: the first indication of the user input, the second indication of the user input, or the third indication of the user input.

According to an example embodiment of the second aspect, the method may further comprise: calibrating a zero level of the triggering signal based on an idle voltage of the first coil.

According to an example embodiment of the second aspect, the method may further comprise: activating detection of the user input, in response to detecting the triggering signal to reach or exceed a second threshold.

According to an example embodiment of the first aspect, the detection circuitry may be coupled to a plurality of the first coils. The method may further comprise detecting the user input on the surface based on a plurality of triggering signals corresponding to the plurality of the first coils: and activating a plurality of the feedback signals for the plurality of the first coils, in response to the detecting the user input by the detection circuitry.

According to an example embodiment of the second aspect, the method may further comprise: detecting a location of the user input at the surface based on voltage or current levels induced by the user input at the plurality of the first coils.

According to an example embodiment of the second aspect, the method may further comprise: determining the plurality of the feedback signals based on the location of the user input at the surface.

According to an example embodiment of the second aspect, the method may further comprise: determining the plurality of the feedback signals based on a mapping between the location of the user input at the surface and at least one feedback signal.

According to an example embodiment of the second aspect, the method may further comprise: receiving an indication of the mapping between the location of the user input at the surface and the at least one feedback signal.

According to an example embodiment of the second aspect, the plurality of feedback signals may be identical.

According to a third aspect, a computer program may comprise instructions for causing an apparatus to perform at least the following: detecting a user input on a surface based on a triggering signal comprising a voltage or current induced at a first coil by displacement of the surface by a user: activating a feedback signal, in response to detection of the user input: and generating a magnetic field by a second coil to cause or alter movement of the surface, in response to activation of the feedback signal. The computer program may further comprise instructions for causing the apparatus to perform any example embodiment of the method of the second aspect.

According to a fourth aspect, an apparatus may comprise means for detecting a user input on a surface based on a triggering signal comprising a voltage or current induced at a first coil by displacement of the surface by a user; means for activating a feedback signal, in response to detection of the user input: and means for generating a magnetic field by a second coil to cause or alter movement of the surface, in response to activation of the feedback signal. The apparatus may further comprise means for performing any example embodiment of the method of the second aspect.

Any example embodiment may be combined with one or more other example embodiments. Many of the attendant features will be more readily appreciated as they become better understood by reference to the following detailed description considered in connection with the accompanying drawings.

DESCRIPTION OF THE DRAWINGS

The accompanying drawings, which are included to provide a further understanding of the example embodiments and constitute a part of this specification, illustrate example embodiments and together with the description help to understand the example embodiments. In the drawings.

Like references are used to designate like parts in the accompanying drawings.

DETAILED DESCRIPTION

Reference will now be made in detail to example embodiments, examples of which are illustrated in the accompanying drawings. The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
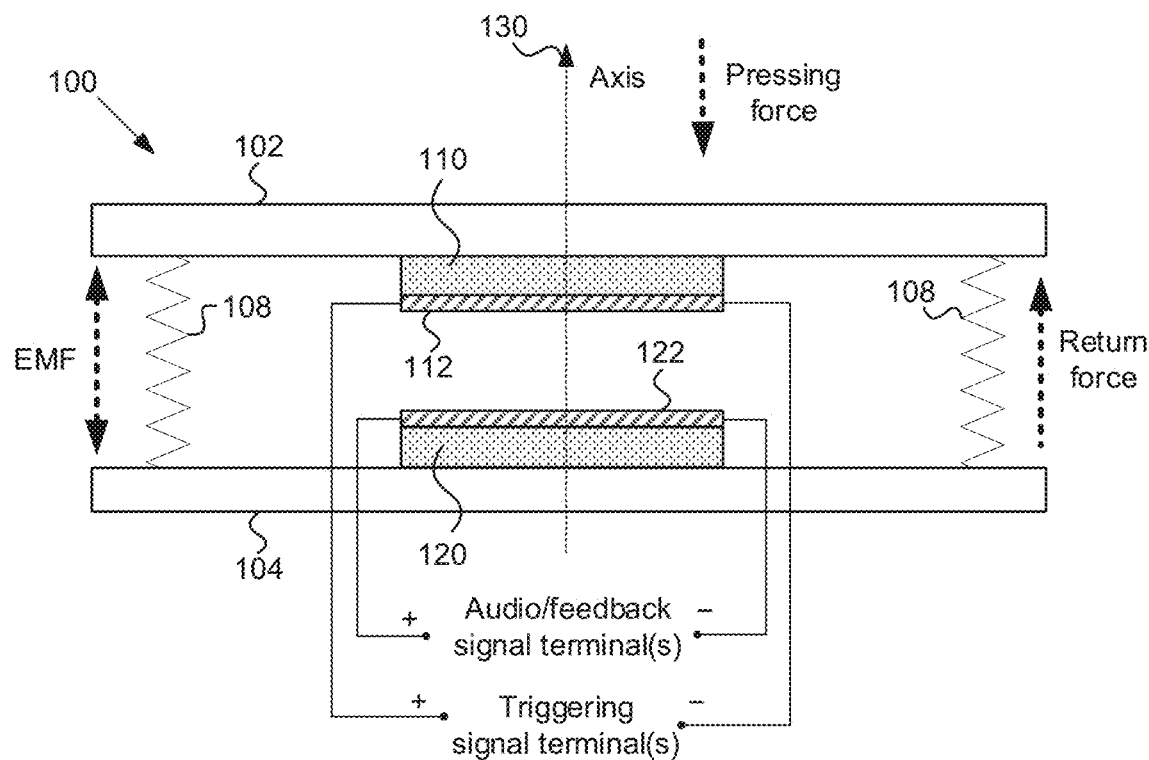
FIG. 1 illustrates a cross-sectional view of an example of a surface audio device configured for providing audio or haptic feedback, according to one or more example embodiments.

FIG. 1 illustrates a cross-sectional view of an example of a surface audio device configured for providing audio or haptic feedback, according to an example embodiment. In general, the surface audio device 100 may be configured to generate vibration, such as for example audio output (e.g. audio signals and/or audio feedback) or haptic output (e.g. haptic feedback) to a user, for example in response to detecting a user input (e.g. pressing) of the surface audio device 100. The surface audio device 100 may be called a surface acoustic device, or, a surface audio haptic device (SAHD) when the device is configured to provide haptic feedback. The surface audio device 100 may comprise or be configured to be coupled to a surface 102, which may be configured to be mechanically displaced, for example along the axis 130. The axis 130 may be substantially perpendicular to the surface 102. The surface audio device 100 may further comprise a first magnetic element 110, which may be or be configured to be coupled to the surface 102. The surface audio device 100 may further comprise at least one supporting member 108 for supporting the surface 102, for example with respect to a base 104. The surface audio device 100 may further comprise a first coil 112, which may be or be configured to be coupled to the surface 102. For example, the first coil 112 may be attached to the first magnetic element 110 and located below the first magnetic element 110 along the axis 130. Hence, the first magnetic element 110 may be located at least partially (partially or fully) between the first coil 112 and the surface 102. The surface audio device 100 may further comprise a second magnetic element 120, which may be coupled to the base 104. The second magnetic element 120 may be arranged to face the first magnetic element 110, as shown in FIG. 1. The surface audio device 100 may further comprise a second coil 122 arranged between the first and second magnetic elements 110, 120. The second coil 122 may be attached to the second magnetic element 120 and located above the second magnetic element 120 along the axis 130. Hence, the second magnetic element 120 may be located at least partially between the second coil 122 and the base 104. The first coil 112 may be referred to as a sensing coil or detection coil. The second coil 122 may be referred to as a feedback coil, a haptic coil, an audio coil, a sound coil, or a voice coil. The first magnetic element 110 and/or the second magnetic element 120 may comprise a permanent magnet, or magnetizable material, for example ferromagnetic and/or ferrimagnetic material such as iron. The magnetic elements may take different forms in different embodiments and at least one of the magnetic elements 110, 120 may comprise a permanent magnet. The magnetic element 110 and/or the magnetic element 120 may be also implemented as a combination of several magnetic components.

According to an example embodiment, the first magnetic element 110 may comprise a permanent magnet. The first magnetic element 110 may therefore cause a static magnetic field within the surface audio device 100. The second magnetic element 120 may comprise magnetizable material, which may be magnetized by the magnetic field provided by the first magnetic element 110. It is however also possible that the second magnetic element 120 is not present, or, the second magnetic element 120 comprises a permanent magnet.

According to an example embodiment, the second magnetic element 120 may comprise a permanent magnet. The first magnetic element may comprise magnetizable material. An attractive force may be generated between the first magnetic element 110 and the second magnetizable element 120. The first magnetic element 110 may alternatively comprise another permanent magnet.

The magnetic field provided by at least one of the magnetic elements 110, 120 may cause an electromagnetic force (EMF) to the surface 102 when providing an electric current to the second coil 122, or cause a voltage to be induced at the first coil 112 when pressing the surface 102. The system may be characterized by EMF(V)=Blv, where B is the magnetic flux density of the magnetic field, l is the length of the coil wire of the first coil 112, and v is the speed of the movement of the first coil 112 along the axis 130, caused by a pressing force affecting the surface 102. The EMF may be expressed in Volts (V). The surface 102 and/or the at least one supporting member 108 may comprise at least one elastic element providing a force (e.g. a return force), which may act as a counterforce to the electromagnetic force or the pressing force. The surface 102 may be thus supported with respect to the base 104, which may in some embodiments comprise the supporting member(s) 108. This enables movement of the surface with respect to axis 130 with velocity (v), which causes a voltage to be induced at the first coil 112. The surface 102 may be therefore caused to be in a force equilibrium state. In general, the surface 102 may comprise a panel to be vibrated. The surface 102 may be rigid, for example not bending or bending just a little. The surface 102 may comprise a plane. The surface 102 may comprise, for example, metal, wood, glass, and/or plastics. The thickness of the surface 102 may be at least 1 mm, 2 mm, 3 mm, 5 mm, 1 cm, 2 cm, or 5 cm. The base 104 may comprise a panel that is mechanically grounded.

The electrical signal in the second coil 122 may be proportional to mechanic displacement of the surface 102. The force equilibrium state may be broken by the electrical signal in the second coil 122. For example, when an electrical signal is fed via the audio/feedback signal terminals to the second coil 122, the force equilibrium may be broken. Hence, the surface 102 may be caused to vibrate according to the electromotive force (EMF) generated by the electrical input signal in the second coil 122. Alternatively, the force equilibrium may be broken by mechanic displacement of the surface 102 from the position of the force equilibrium state, for example by pressing the surface 102 by the user. It is noted that the polarities of the magnetic elements 110, 120 may be arranged in any suitable manner. For example, in an attractive configuration, opposite magnetic poles may be arranged towards each other (N-S to N-S or S-N to S-N). The force equilibrium may be therefore caused by the attractive magnetic force between the magnetic elements 110, 120 and an opposite support force provided by the supporting member(s) 118 that prevent the magnetic elements 110, 120 from being drawn to each other. Alternatively, in a repulsive configuration, same magnetic poles may be arranged towards each other (N-S to S-N or S-N to N-S). The force equilibrium may be therefore caused by the repulsive magnetic force between the magnetic elements 110, 120 and an opposite support force provided by the supporting member(s) 118 that prevents the magnetic elements 110, 120 from being pushed away from each other.

The surface audio device 100 may be configured to generate an audio output according to the electrical input signal. Audio output may mean and/or comprise sound that is detectable by human ear, i.e. sound that may be heard by a human. In some examples, it may refer to sound that is detectable by animal(s) and/or audio sensors (e.g. microphone). For example, the audio output may comprise music, speech, sound effects and the like. It is also pointed out that the surface 102 and the base 104 may be, or be comprised in, any suitable apparatus such as for example a mobile phone, a television, a computer, a music player, or some other type of user device. For example, the base 104 may form at least a part of a frame of the apparatus. For example, the surface 102 may be or be comprised in a screen of the apparatus (e.g. an electronic apparatus). The provided solution may be for example applicable to automotive industry (e.g. cars). The surface 102 may comprise car panels such as car interior panel (e.g. door panel, ceiling or roof panel, wall panel, frame panel, or some other part of the car interior). The surface 102 may for example comprise a car display. The surface 102 may be alternatively comprised in a wearable device, such as wearable electronic device. For example, the surface 102 may be comprised a portable electronic device, such as a watch or wrist device (e.g. surface 102 may be comprised in a display of such device).

As noted above, the surface audio device 100 may comprise one or more audio/feedback signal terminals electrically coupled to the second coil 122. The audio/feedback signal terminal(s) may be used to provide audio and/or feedback signals to the second coil 122 to cause generation of audio and/or haptic vibration by the surface 102. A feedback signal may comprise audio and/or haptic feedback. The surface audio device 100 may further comprise one or more triggering signal terminals electrically coupled to the first coil 112. The triggering signal may be alternatively called a sensing signal or detection signal. The triggering signal terminal(s) enable a triggering signal to be delivered from the first coil 112. For example, upon mechanical displacement of the surface 102, for example by pressing the surface 102 along the axis 130, a voltage (triggering voltage) may be induced between the triggering signal terminals. The triggering signal may be used to detect pressing of the surface 102 and to trigger audio/haptic feedback to be generated by means of the second coil 122, as will be further described below. Even though the audio/feedback signal terminals and triggering signal terminals have been illustrated to include both positive and negative terminals, it is appreciated that each coil could be alternatively coupled to a single terminal with respect to a ground potential.

The surface 102 may be supported with respect to the base 104 using various solutions. The supporting member(s) 108 may for example comprise spring(s) disposed between the surface 102 and the base 104. However, the supporting member(s) 108 may not be present in some embodiments, since the counterforce may be also provided by other means, such as for example by pair(s) of magnets coupled with the surface 102 and the base 104. For example, the pair(s) of magnets could be configured to provide a force that is opposite to the force provided by the first magnetic element 110 and the second magnetic element 120. For example, if the first magnetic element 110 and the second magnetic element 120 are configured to provide an attractive force, the pair(s) of magnets may be configured to provide a repulsive force, or vice versa.

Coupling of a magnetic element with the surface 102 or the base 104 may comprise fixing or attaching the magnetic element to the surface 102 or the base 104. Such fixing may be performed for example using glue and/or screw(s). Magnetic elements may be also printed on the surface 102 and/or the base 104. The coupling may therefore comprise printing (e.g. electronics printing). Furthermore, the arrangement of the coils 112, 122 between the magnetic elements 110, 120 may comprise coupling (e.g. fixing or attaching) the coils with respective magnetic elements. However, the first coil 112 and/or the second coil 122 may be also arranged as separate elements between the magnetic elements 110, 120. Hence, the respective coil 112, 122 may not physically touch the respective magnetic element 110, 120. For example, the first coil 112 may be attached to the surface 102 or some other part of the surface audio device 100 to place the first coil 112 at the area between the magnetic elements 110, 120. Similarly, the second coil 122 may be attached to the base 104 or some other part of the surface audio device 100 to place the second coil 122 at the area between the magnetic elements 110, 120. It is noted that the example of FIG. 1 illustrates one possible arrangement of the magnetic elements 110, 120 and the coils 112, 122 with respect to the surface 102 and the base 104. Similar functionality may be also achieved with alternative arrangements, as described for example with reference to FIG. 3 and FIG. 4. Example embodiments of the present disclosure therefore enable user input detection and haptic and/or audio feedback functionalities to be implemented within a single construction. For example, a single coil may be used for providing both audio signals and feedback to the user, while another coil may be integrated within the same structure and dedicated for detecting the user input.

Figure 2:
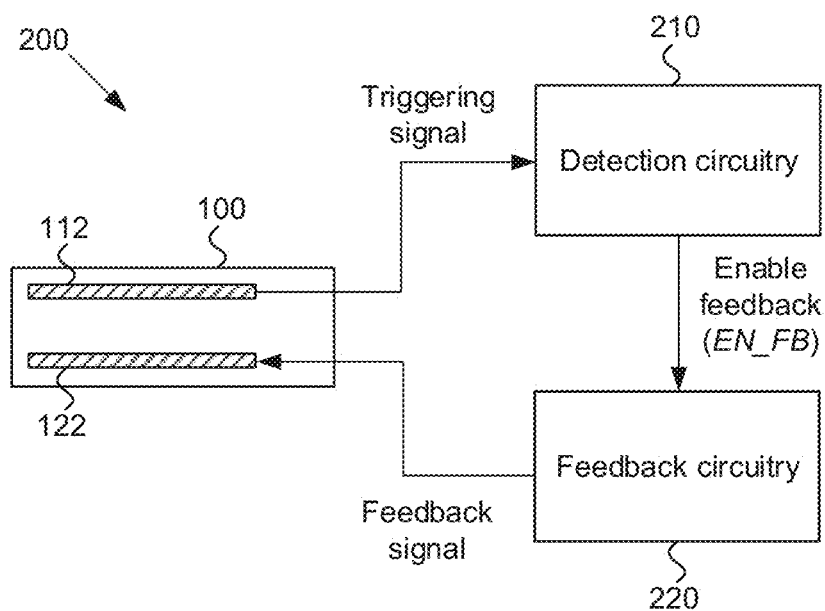
FIG. 2 illustrates an example of a block diagram of a surface audio device with audio or haptic feedback, according to one or more example embodiments.

FIG. 2 illustrates an example of a block diagram of a surface audio device with audio or haptic feedback, according to one or more example embodiments. A simplified version of the surface audio device 100 is illustrated in FIG. 2. The surface audio device 100 may comprise the first and second coil 112, 122. In addition to these components, the surface audio device 200 may comprise detection circuitry 210 and feedback circuitry 220.

The detection circuitry 210 may be coupled (electrically) to the first coil 112, for example to receive triggering signal(s) from the first coil 112 and to detect user inputs based on the triggering signal. A triggering signal may comprise a voltage or current induced at the first coil 112 by displacement of the surface by a user. In response to detecting a user input, e.g. press of the surface 102, the detection circuitry 210 may provide an enable feedback signal (EN_FB) to the feedback circuitry 220. Providing an enable signal may comprise changing a state of the enable signal, for example from a level indicative of logical low to a level indicative of logical high.

The feedback circuitry 220 may be coupled (electrically) to the second coil 122, for example to provide feedback signal(s) to the second coil 122. The feedback circuitry 220 may be configured to activate (and deactivate) the feedback signal according to the enable feedback signal provided by the detection circuitry, that is, in response to detection of the user input by the detection circuitry 210. The second coil 120 may be configured to cause movement of the surface 102 based on a magnetic field configured to be generated by the second coil 102 upon activation of the feedback signal. For example, if a direct current (DC) signal is provided as a feedback signal, the magnetic field may cause the surface 102 to be lifted, thereby resulting in a single bump as haptic feedback. Alternatively, the feedback signal may comprise an alternating current (AC) signal, which may cause the surface 102 to vibrate. Vibrations of the surface 102 may be sensed by the user as haptic feedback and/or audio feedback.

The second coil 122 may be additionally coupled to an audio source, for example an audio amplifier (AMP) integrated with the feedback circuitry 220, which may be configured to play audio signals (e.g. music or sounds) by causing vibration of the surface 102 by means of the second coil 122. If audio playback is ongoing, and therefore the surface 102 vibrating, the feedback signal may alter the movement of the surface 102 by altering the magnetic field provided by the second coil 122. For example, a haptic feedback signal or an audio feedback signal may be superimposed to the audio signal played by the audio source.

The detection circuitry 210 and the feedback circuitry may be implemented using analog or digital circuits, or a combination thereof. In the analog domain these circuitries may be implemented for example based on comparator, derivator, or integrator circuits, or the like. In the digital domain, the circuitries may comprise digital components such as for example logic gates, other digital logic, or processor circuitry associated with at least one memory.

Figure 3:
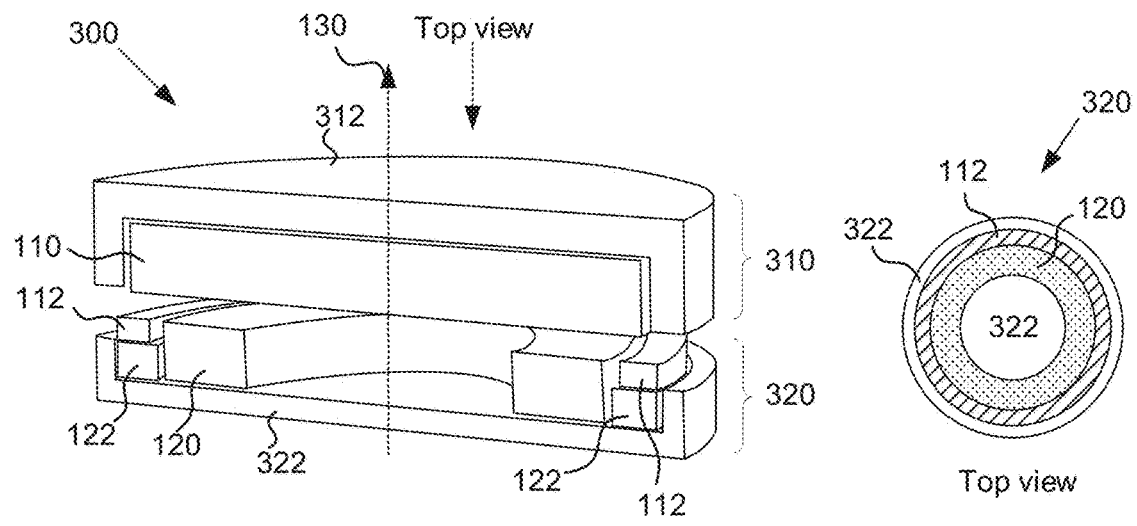
FIG. 3 illustrates an example of a surface audio device with detection and feedback coils arranged outside a magnetic element, according to one or more example embodiments.

FIG. 3 illustrates an example of a surface audio device with detection and feedback coils arranged outside a magnetic element, according to one or more example embodiments. The surface audio device 300 may comprise similar components as the surface audio device 100, for example the first and second coils 112, 122 and the first and second magnetic elements 110, 120. The surface audio device 300 may further comprise at least one third magnetic element 312 and/or at least one fourth magnetic element 322 comprising magnetic material. The magnetic element(s) 312, 322 may comprise or be made of magnetizable material that acquire their magnetic properties under an external magnetic field. The magnetic element(s) 312, 322 may for example comprise ferromagnetic and/or ferrimagnetic material(s), such as for example iron. The third magnetic element 312 may comprise a cavity for the first magnetic element 110. The third magnetic element 312 may for example enclose the first magnetic element 110 from the top of the first magnetic element 110 and at least partially from the sides of the first magnetic element 110. The fourth magnetic element 322 may comprise a cavity for the second magnetic element 120, the first coil 112, and/or the second coil 122. The fourth magnetic element 322 may for example enclose the second magnetic element 120 from the bottom of the second magnetic element 120 and at least partially from the sides of the second magnetic element 120.

A top portion 310 of the surface audio device 300 may comprise at least the first magnetic element 110. The top portion 310 may further comprise the third magnetic element 312. The top portion 310 may be or be configured to be coupled to the surface 102 (not shown). A base portion 320 may comprise at least the first coil 112 and the second coil 122. The base portion 320 may further comprise the second magnetic element 120 and/or the fourth magnetic element 322. Displacement of the surface 102 by the pressing force provided by the user may be configured to cause movement of the top portion 310 towards the base portion 320. Displacement of the surface 102 may be configured to cause relative movement between the first magnetic element 110 and the first coil 112 to induce the triggering signal at the first coil 112. However, in general the displacement of the surface 102 may be configured to cause relative movement between at least one magnet and the first coil 112 to induce the triggering signal. For example, in the arrangement of FIG. 1, the displacement of the surface 102 may be configured to cause a relative movement between the second magnetic element 120 and the first coil 112 to induce the triggering signal. Various different arrangements may be therefore used to cause generation of the triggering signal by the user.

At the base portion 320, the first coil 112 may be located closer to the top portion 310 than the second coil 122, for example on top of the second coil 122. This provides good detection sensitivity, since placement of the first coil 112 outside the second magnetic element 120 enables to increase the wire length of the first coil 112, thus also increasing the level of the EMF induced at the first coil 112. Sensitivity of user input detection may be therefore improved. Furthermore, since the diameter of the first coil 112 may be substantially equal to or higher than the outer diameter(s) of the first and/or second magnetic elements 110, 120, majority of the magnetic flux may flow through the first coil 112, thereby further increasing the level of the induced EMF. It is however possible that the second coil 122 may be located closer to the top portion 310 than the first coil 112, for example on top of the first coil 112. The first and second coils 112, 122 may be arranged around the second magnet, which may be circular and lie at a plane defined by the fourth magnetic element 322, or in general the base 104. The base portion 320 is further illustrated on the right by a top view. The first and second coils 112, 122 may be substantially concentric and have substantially same diameter and therefore only the first coil 112 is visible in the top view. However, when the first and second coils 112, 122 have a substantially same diameter, they could also just partially overlap when viewed from the top. For example, the first and second coils 112, 122 may not have the same thickness, i.e. difference between the inner and outer diameters of each coil.

Furthermore, at least part of the first coil 112 and/or at least part of the second coil 122 may be configured to encircle the second magnetic element 120. When a coil is configured to partially encircle the second magnetic element 120, at least one wire of the coil may encircle the second magnetic element 120.

It is also noted that the fourth magnetic element 322 may enclose the second coil 122 from the bottom and from the sides but may not enclose the first coil 112 from the sides. This enables to further increase the size (e.g. diameter) and wire length of the first coil 112, thereby further improving the detection sensitivity. The second magnetic element 120 may take various forms. In the example of FIG. 3, the second magnetic element 120 is enclosed by the fourth magnetic element 322 from the bottom and partially from the sides. It is however possible that the second magnetic element 120 is fully enclosed by the second magnetic element from the sides of the second magnetic element 120. The first coil 112 and/or the second coil 122 may be however located between the second magnetic element 120 and the fourth magnetic element 322. The second magnetic element 120 may be circular (hollow cylinder), as in FIG. 3, or it may be cylindrical. The second magnetic element 120 may however take any suitable shape, for example a rectangular cylinder or a hollow rectangular cylinder. The shape of the first and second coils 112, 122 may be also non-circular, for example rectangular. The first and second coils 112, 122 may comprise planar coils, for example wound or printed such that coil wires of a single coil do not overlap in the direction of the axis 130. Alternatively, the first and second coils 112, 122 may be wound such that the coil wires of a single coil overlap also (or only) in the direction of the axis 130. According to an example embodiment, the resistance of the first coil 112 may be between 22-26 ohms, for example approximately 24 ohms. The length of the wire of the first coil 112 may be 3.8-4.2 m, for example approximately 4 m. The first coil may have 90-110 turns, for example 100 turns. Such choices for the coil parameters enable to improve sensitivity of user input detection when the first coil 112 is located inside the second magnetic element 120.

Figure 4:
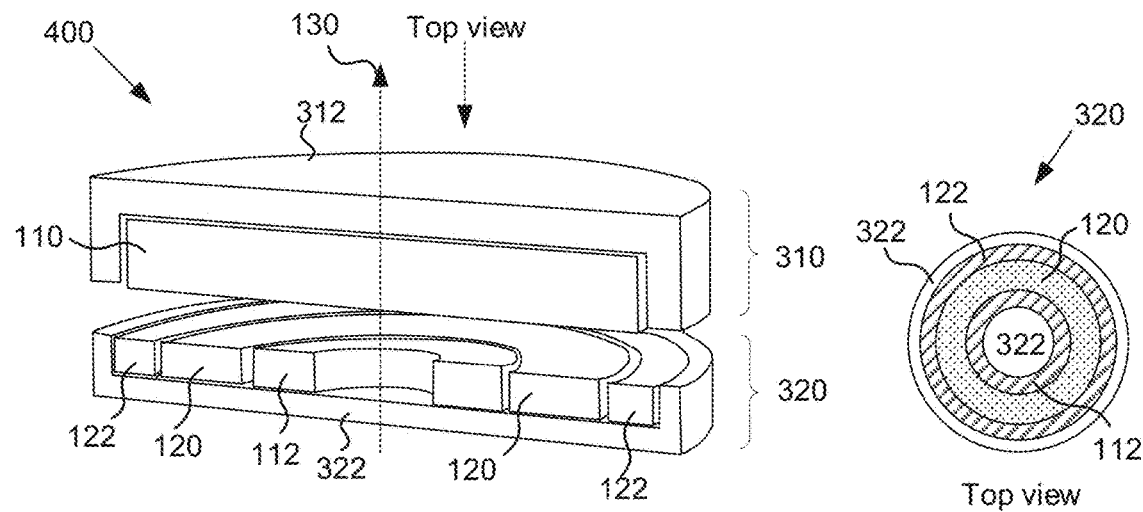
FIG. 4 illustrates an example of a surface audio device with a detection coil arranged inside a circular magnetic element, according to one or more example embodiments.

FIG. 4 illustrates an example of a surface audio device with a detection coil arranged inside a circular magnetic element, according to one or more example embodiments. The surface audio device 400 may comprises a top portion 310 and a base portion 320, which may comprise similar components as described with reference to FIG. 3. However, the first coil 112 may be located inside the second magnetic element 120, which may for example have a circular shape. Placing the first coil 112 inside the second magnetic element 120 reduces the amount of space needed for implementing the two-coil structure, while still enabling sufficient detection sensitivity. At least part of the second magnetic element 120 may be therefore configured to encircle the first coil 112. This enables to provide sufficient detection sensitivity, while also enabling to reduce thickness of the surface audio device since the first coil 112 and the second coil 122 may be arranged at the same plane, for example on top of the fourth magnetic element 322. The second coil 122 may be located similar to FIG. 3 such that at least part of the second coil 122 is configured to encircle the second magnetic element 120. According to an example embodiment, the resistance of the first coil 112 may be between 29-33 ohms, for example approximately 31 ohms The length of the wire of the first coil 112 may be 4.8-5.2 m, for example approximately 5 m. The first coil 112 may have 340-360 turns, for example 350 turns. Such choices for coil the parameters enable to improve sensitivity of user input detection when the first coil is located inside the second magnetic element 120.

Figure 5:
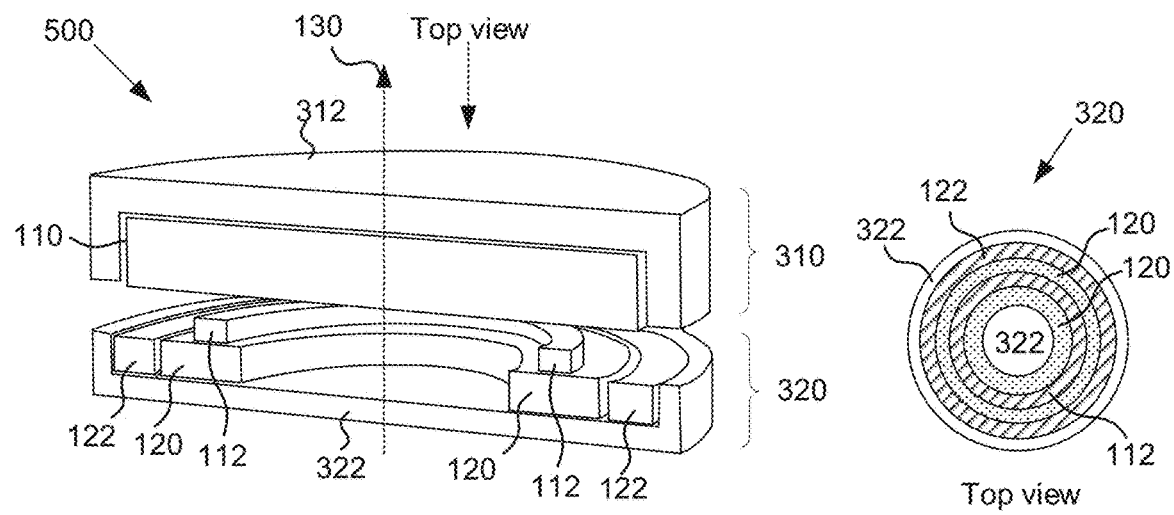
FIG. 5 illustrates an example of a surface audio device with a detection coil arranged above a magnetic element, according to one or more example embodiments.

FIG. 5 illustrates an example of a surface audio device with a detection coil arranged above a magnetic element, according to one or more example embodiments. The surface audio device 500 may comprises a top portion 310 and a base portion 320, which may comprise similar components as described with reference to FIG. 3. The first coil 112 may be however located above the second magnetic element 120, which may for example have a circular shape as in FIG. 5. This enables to increase the length of the wire of the first coil 112 and therefore to improve detection sensitivity. If the second magnetic element 120 is circular, the inner diameter of the first coil 112 may be higher or equal to the inner diameter of the second magnetic element 120. The outer diameter of the first coil 112 may be smaller or equal to the outer diameter of the second magnetic element 120. The first coil 112 may be located closer to the top portion 310 than the second magnetic element 120, for example on top of the second magnetic element 120. In the example of the top view of FIG. 5, the inner diameter of the first coil 112 is larger and the outer diameter of the first coil 112 is smaller compared to corresponding diameters of the second magnetic element 120. It is noted that even though the elements of FIG. 3, FIG. 4, and FIG. 5 have been illustrated to have particular shapes, sufficiently similar functionality may be achieved also with other shapes of the elements.

Figure 6:
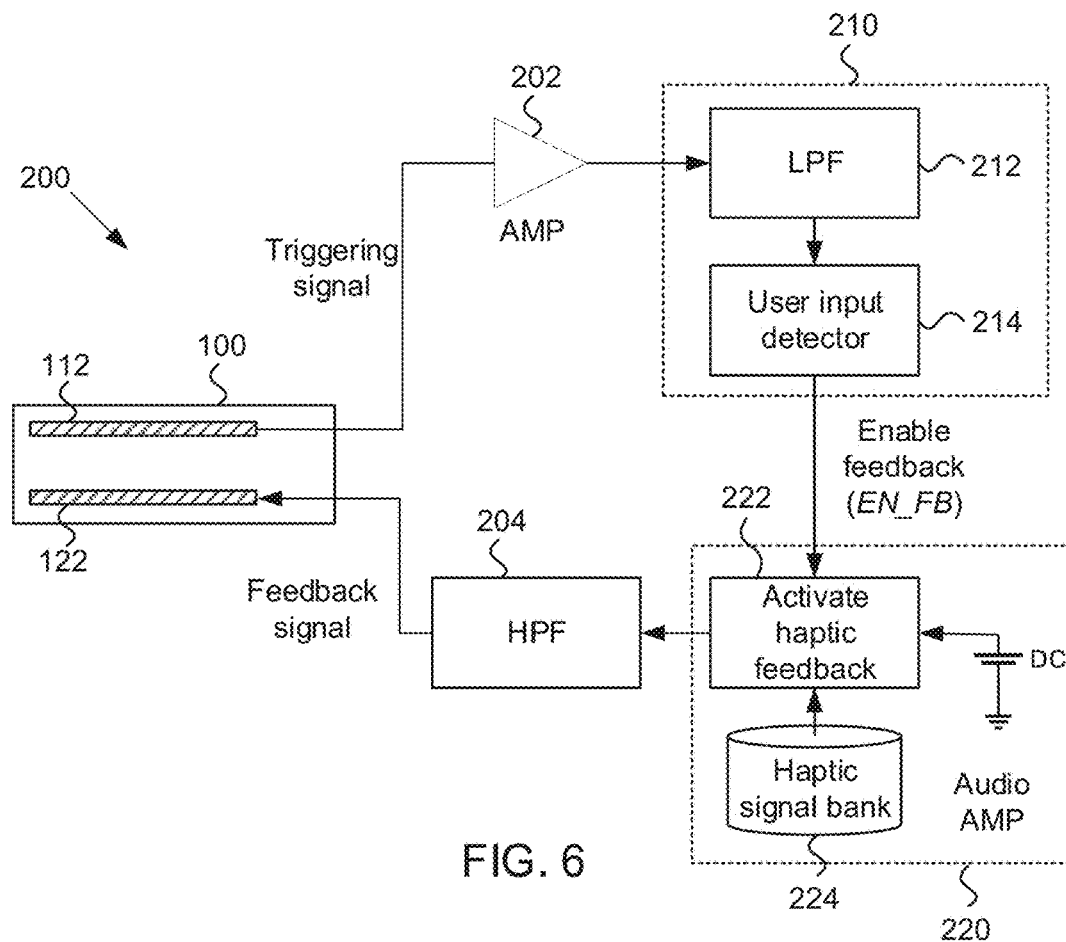
FIG. 6 illustrates an example of a block diagram of a surface audio device with low-pass filtering of a triggering signal, according to one or more example embodiments.

FIG. 6 illustrates an example of a block diagram of a surface audio device with low-pass filtering of a triggering signal, according to one or more example embodiments. The surface audio device 200 may comprise similar components as described with reference to FIG. 2. The surface audio device 200 may further comprise an amplifier (AMP) 202 between the first coil 112 and the detection circuitry. Alternatively, the amplifier 202 may be implemented within the detection circuitry 210 or the system may be implemented without the amplifier 202. The detection circuitry 210 may comprise a low-pass filter (LPF) 212. The low-pass filter 212 may be implemented using any suitable circuitry. The low-pass filter may comprise for an analog RC (resistor-capacitor) circuit, or, if the detection circuitry 210 is (at least partially) implemented using digital logic, the low-pass filter 212 may comprise for example a finite impulse response (FIR) filter or an infinite impulse response (IIR) filter configured to process digital samples obtained by analog-to-digital (A/D) conversion of the (optionally amplified) triggering signal. The low-pass filter may be configured to low to pass haptic frequencies (e.g. 0-10 Hz) and suppress audio frequencies (e.g. 20 Hz-20 kHz). A cut-off frequency of the low-pass filter may be therefore for example between 8-20 Hz or 10-20 Hz. The low-pass filter 212 enables to filter out disturbances in the triggering signal. Such disturbances may be caused for example by crosstalk from the second coil 122 to the first coil 112 when providing audio and/or feedback signals via the second coil 122. The low-pass filter 212 therefore enables to isolate the triggering signal from the audio and/or feedback signals. According to an example embodiment, the cut-off frequency of the low-pass filter 212 is between 8-12 Hz, for example approximately 10 Hz. This enables to detect fast press-release actions occurring in the order of 0.1 s, while providing sufficient guard distance to the audio signals. In digital implementations the guard distance enables to use a low-complexity filter, which reduces the processing time and hence enables timely feedback to be provided to the user. The detection circuitry 210 may further comprise a user input detector 214, which may be implemented with analog circuitry or digital signal processing (DSP), as will be further described with reference to FIG. 10

As discussed above, the detection circuitry 210 may provide an enable feedback signal (EN_FB) to the feedback circuitry 220 in response to detecting a user input. The feedback circuitry may comprise or operate as an audio amplifier (AMP). The feedback circuitry 220 may comprise circuitry 222 for activating haptic feedback. Alternatively, or additionally, audio feedback may be provided. The feedback signal may be retrieved from a signal back, for example a haptic signal bank 224 and/or an audio signal bank. The signal bank may be for example included in a memory of the surface audio device 200. The feedback circuitry 220 may access the memory to retrieve the feedback signal from the signal bank upon enablement of the feedback signal. Alternatively, or additionally, the feedback signal may comprise a DC (direct current) voltage or a DC current. If the DC current or voltage is provided in addition to an audio feedback signal and/or audio played from an audio source, the DC current or voltage may form a component of the electric signal provided to the second coil 122. Applying the DC current or voltage as haptic feedback enables to generate haptic feedback (e.g. a single bump of the surface 102), which may be easily recognized by the user from other vibrations of the surface 102 caused for example by audio playback.

The surface audio device 200 may further comprise a high-pass filter (HPF) 204 for filtering the feedback signal. Use of the high-pass filter 204 may be however optional. The high-pass filter 204 may be used for example to reduce the amount of interference caused to the triggering signal when the feedback signal comprises an audio signal.

Figure 7:
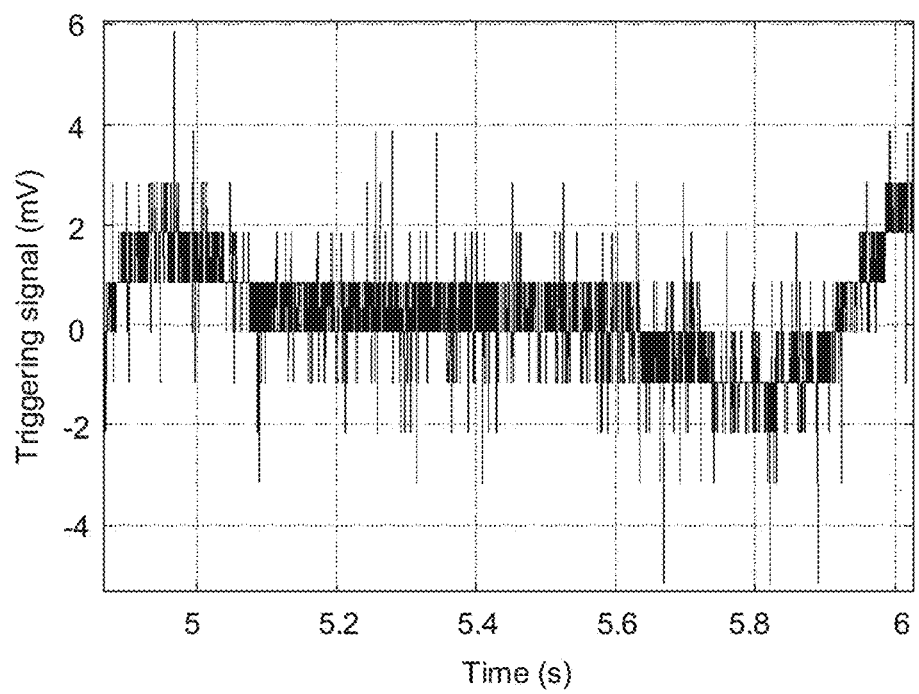
FIG. 7 illustrates an example of a raw triggering signal for a press-and-release operation, according to one or more example embodiments.

FIG. 7 illustrates an example of a raw triggering signal for a press-and-release operation, according to one or more example embodiments. The voltage (mV) of the raw triggering signal is illustrated with respect to time (s) as it is coming form the first coil 112. It is observed that the raw triggering signal has high frequency components, for example due to audio interference, superimposed on the voltage induced in the first coil 112 by the user input.

Figure 8:
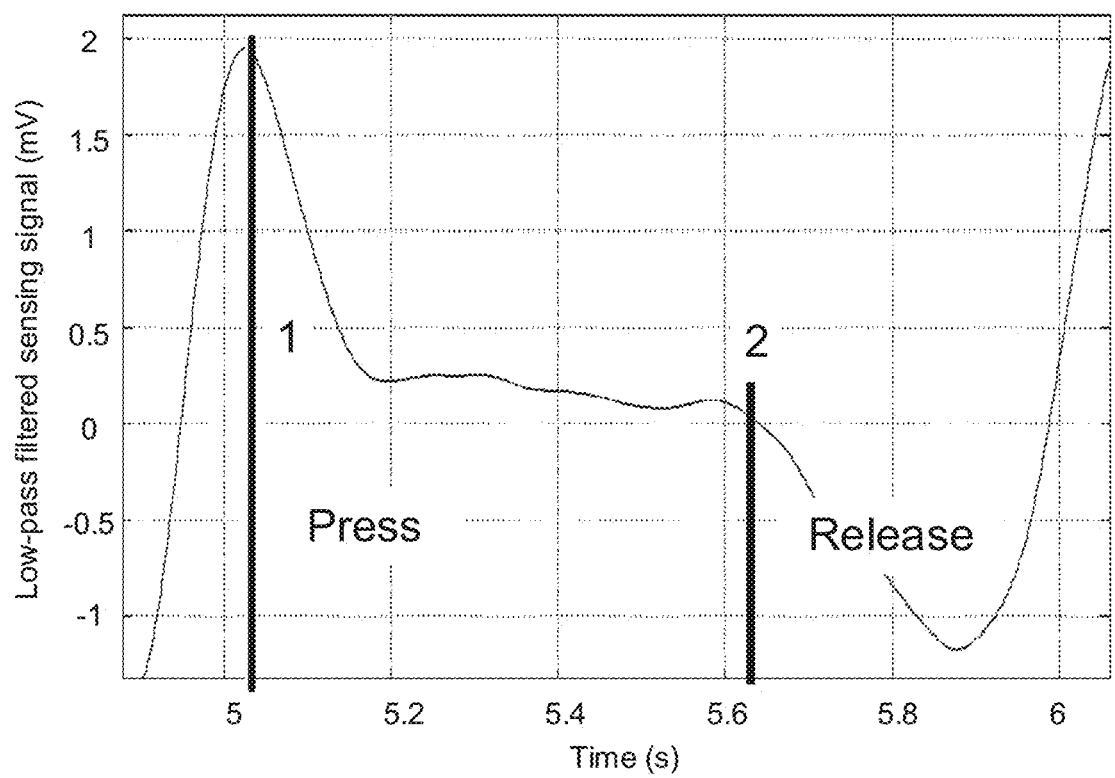
FIG. 8 illustrates an example of a low-pass filtered triggering signal for a press-and-release operation, according to one or more example embodiments.

FIG. 8 illustrates an example of a low-pass filtered triggering signal a press-and-release operation, according to one or more example embodiments. A peak ("1") of the voltage induced at the first coil 112 occurs when the movement of the surface 102 (coupled with the first magnetic element 110 and/or the first coil 112) towards the base 104 is fastest, that is, during pressing the surface 102. Upon release ("2") of the surface the voltage crosses the zero level and a negative voltage is induced to the first coil 112 when the surface 102 moves away from the base. In other words, point "1" may correspond to the maximum speed of the movement and point "2" may correspond to change of the direction of the movement (zero-crossing). It is noted that the polarity of the voltage may be alternatively arranged to be different, or the voltage may be referenced to ground level, for example in embodiments not including integration of the triggering signal. As will be further described with reference to FIG. 11, the zero-level may be calibrated based on the idle voltage of the first coil 112.

Figure 9:
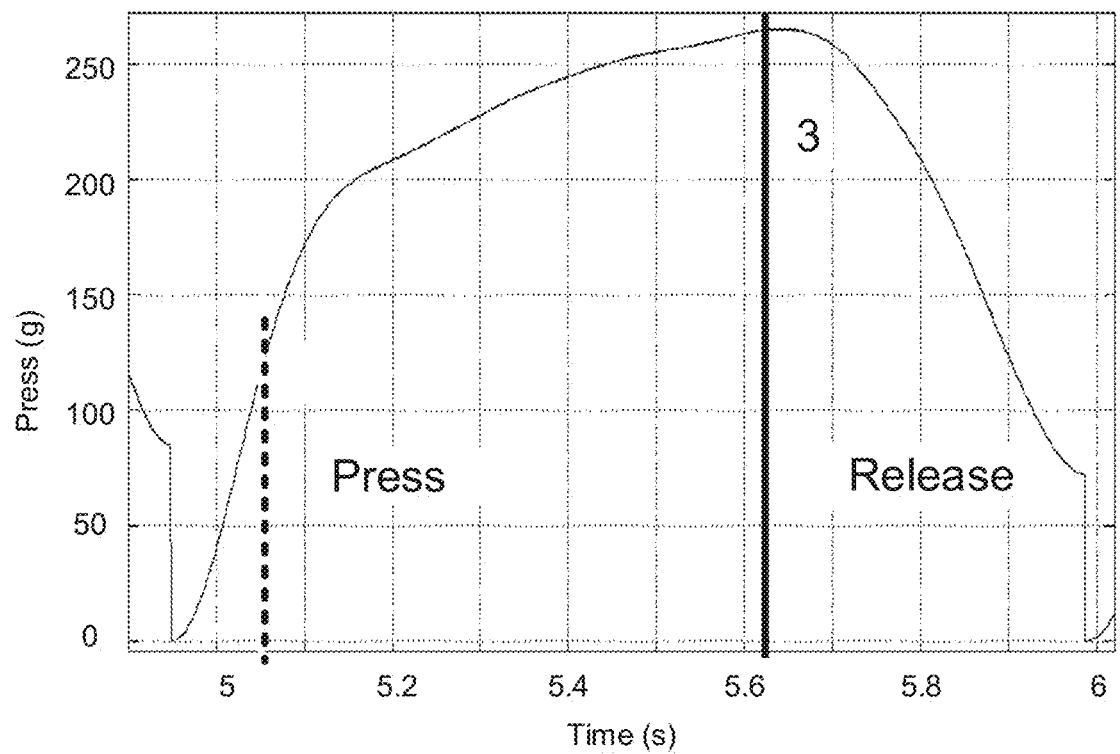
FIG. 9 illustrates an example of a force curve for a press-and-release operation, according to one or more example embodiments.

FIG. 9 illustrates an example of a force curve for a press-and-release operation, according to one or more example embodiments. The force curve of FIG. 9 has been obtained by integration of the triggering signal of FIG. 8. The pressing force (g) is illustrated with respect to time (s). The point of maximum speed is illustrated with the dashed line. This corresponds to point "1" of the low-pass filtered triggering signal (FIG. 8). Point "3" corresponds to the maximum force, which in this example occurs right before the release of the surface 102. Both the triggering signal of FIG. 8 and the force curve of FIG. 9 correspond to a 250 g nominal press with 1 Hz.

Figure 10:
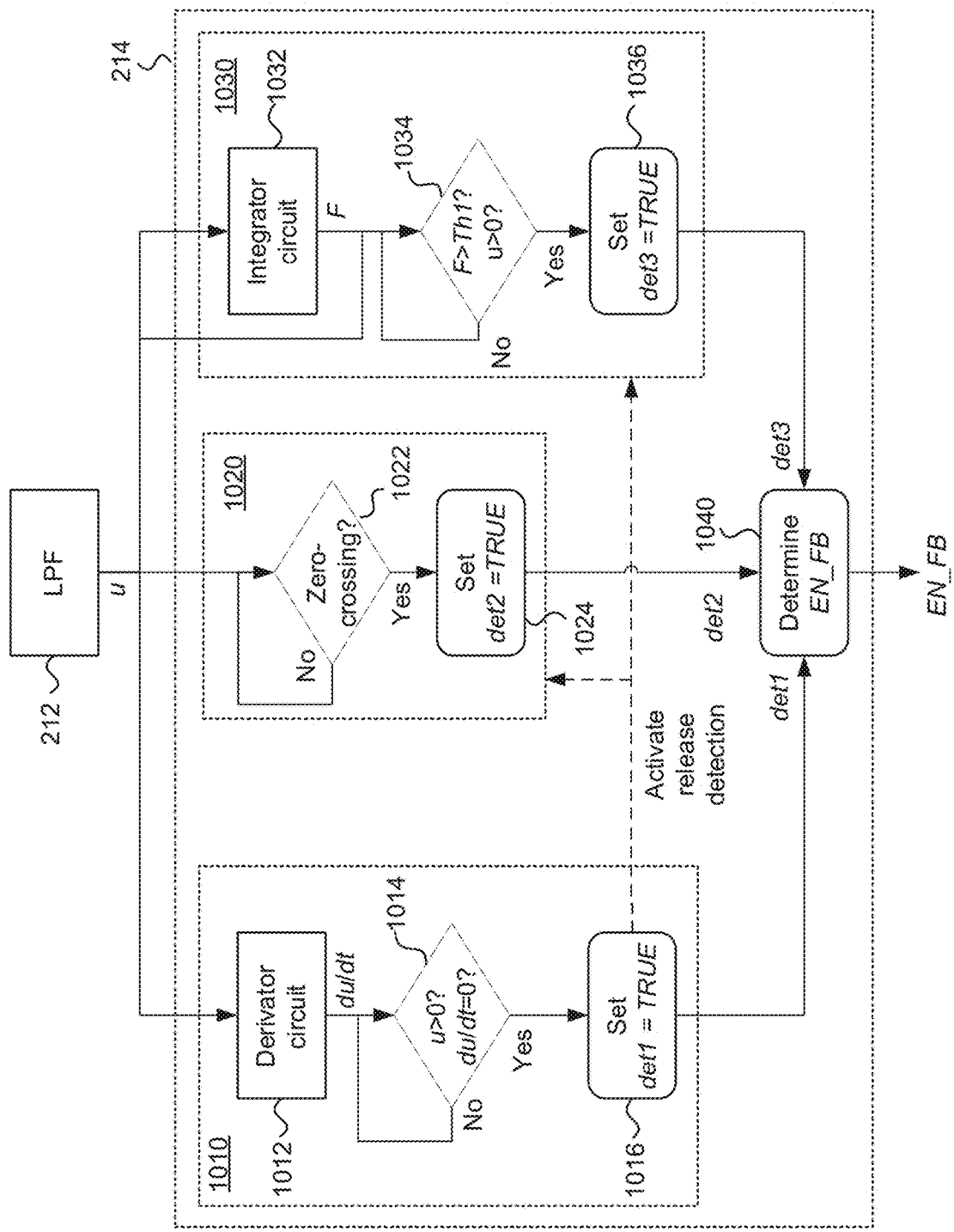
FIG. 10 illustrates an example of a functional block diagram of user input detection circuitry, according to one or more example embodiments.

FIG. 10 illustrates an example of a functional block diagram of user input detection circuitry, according to one or more example embodiments. The user input detector 214 may comprise one or more of the blocks 1010 (peak detector), 1020 (zero-crossing detector), and 1030 (force threshold detector). At block 1040, the user input detector may determine the level of the feedback enable signal (EN_FB) based on indication(s) provided by one or more of these blocks. Therefore, in some embodiments all of the blocks 1010, 1020, and 1030 may not be present. The user input detector 214 may receive as input the triggering signal form the low-pass filter 212. In this example, the triggering signal is represented by the voltage u (sensing voltage, triggering signal voltage), but it is appreciated that similar processing may be applied based on the corresponding current.

Peak detection: The peak detector 1010 may comprise a derivator circuit 1012, which may be implemented as an analog derivator circuit or by digital processing (e.g. based on differences between consecutive samples of the triggering signal). The derivator circuit 1012 may provide as output a derivative (e.g. first order derivative) with respect to a time interval (du/dt). At block 1014, the peak detector 1010 may detect a peak of the triggering signal. In general, depending on the polarity of the triggering signal (voltage), the peak detector 1010 may be configured to detect the peak either at a positive voltage or at a negative voltage. In the example of FIG. 10, the peak detector 1010 is configured to detect a positive voltage peak (u>0). For example, at block 1014, the peak detector 1014 may determine whether u>0 and whether the derivative of the triggering signal is (substantially) equal to zero (du/dt=0). It is noted that determining whether du/dt is substantially zero may in practise comprise determining whether du/dt decreases below a threshold. In response to detecting a peak at block 1014, the peak detector 1010 may provide a first indication of the user input, for example by setting a corresponding logical signal (det1) to TRUE at block 1016. In response to detecting the peak, which may correspond to point "1" of FIG. 8, the peak detector 1010 may activate the zero-crossing detector 1020 and/or the force threshold detector 1030. It is however noted that the zero-crossing detector 1020 and/or the force threshold detector 103 may be alternatively operated independent of any activation control signal provided by the peak detector 1010. For example, two or more of the blocks 1010, 1020, 1030 may run in parallel and provide respective indications independently.

Zero-crossing detection: At block 1022, the zero-crossing detector 1020 may detect zero-crossing of the voltage u. If the zero-crossing detector 1020 is activated by the peak detector 1010. The zero-crossing detector 1020 may detect the first zero-crossing after the activation (u=0) Therefore, the zero-crossing detector does not need to consider the direction of zero-crossing. This reduces complexity. However, it is also possible that the zero-crossing detector 1020 operates independent of the peak detector 1010. The zero-crossing detector 1020 may be therefore alternatively configured to detect zero-crossing in response to reaching the zero level from a predetermined direction, for example from the positive side, as illustrated in FIG. 8. The zero-crossing detection may be configured with a region such that small variations around the zero-level within the region do not cause zero-crossing detection to be triggered. For example, zero-crossing may be detected only when the zero level is crossed such that the voltage increases or decreases to zero from outside the region. In general, the zero-crossing detector may provide a second indication of the user input, for example in response to detecting a zero-crossing of the triggering signal after the peak of the triggering signal and/or in a predetermined direction. The second indication may correspond to detection of the release phase of the user input (cf. point "2" of FIG. 8). The second indication may be provided by setting the corresponding logical signal (det2) to TRUE at block 1024.

Force threshold detection: The force threshold detector 1030 may comprise an integrator circuit 1032, which may be implemented for example as an analog integrator circuit or by digital processing (e.g. based on summing samples of the triggering signal over a time interval). The integrator circuit 1032 may output the force (F), an example of which is provided in FIG. 9. The force signal (F) may therefore comprise an integrated version of the triggering signal (u). The force threshold detector may be configured to detect whether the force reaches a threshold. Optionally, the force threshold detector may be configured to ascertain that the triggering signal is above zero (or alternatively below zero). Therefore, at block 1034, the force threshold detector 1030 may determine whether the force reaches or exceeds a threshold (Th1), for example whether F>Th1 is satisfied, and/or whether the triggering signal is above zero (u>0).

The threshold Th1 may be preconfigured at the force threshold detector 1030, or in general the surface audio device. Alternatively, the surface audio device, for example the force threshold detector 1030, may determine the threshold Th1 based on a maximum force level during one or more previous user inputs. For example, the force level may be determined based on an average, a weighted average, or a minimum of the maximum force level for a plurality of previous user inputs. This enables the system to adapt to different levels of peak forces, which may be caused by different users or by gradual drifting of the peak force, for example due to aging of the components.

In general, the force threshold detector 1030 may provide a third indication of the user input, for example in response to detecting the integrated triggering signal (F) to reach or exceed the threshold (Th1) and optionally detecting the triggering signal (u) to be above zero. The third indication may be provided by setting the corresponding logical signal (det3) to TRUE at block 1036. As noted above, the force threshold detector 1030 may be activated by the peak detector 1010. In this case, the force threshold detector may not need to monitor the level of the triggering signal (u), which reduces complexity. However, the force threshold detector 1030 may be also operated independently from the peak detector 1010. This enables to improve reliability of the user input detector 214, since the force threshold detector 1030 may be able to detect user inputs that are missed by the peak detector 1010.

Feedback enablement: At block 1040, the user input detector 214 may determine whether to provide the feedback enable signal (EN_FB) to the feedback circuitry 220. For example, the user input detector may determine a level (e.g. logical TRUE or FALSE) of the feedback enable signal based on the indications provided by the peak detector 1010, the zero-crossing detector 1020, and/or the force threshold detector 1030. The feedback enable signal may therefore comprise for example a binary signal or a Boolean signal. Providing the feedback enable signal may comprise setting EN_FB to a level indicative of a logical TRUE. Providing the feedback enable signal to the feedback circuitry 220 may trigger the feedback circuitry 220 to activate the feedback signal. Activating the feedback signal may comprise causing a voltage or current corresponding to the feedback signal to be provided to the second coil 122.

According to an example embodiment, the feedback signal may be enabled in response to receiving an indication of a detected event (e.g. peak of the triggering signal, zero-crossing of the triggering signal, or crossing of the force threshold Th1) from one of the blocks 1010, 1020, and 1030. Hence, at block 1040 the user input detector 214 may determine the enable feedback signal based on EN_FB=det1 OR det2 OR det3. Alternatively, for example if the peak detector 1010 is configured to activate the zero-crossing detector 1020 and/or the force threshold detector 1030, the user input detector 214 may enable the feedback signal in response to receiving an indication of a detected event from the zero-crossing detector 1020 and/or the force threshold detector 1030. Hence, at block 1040 the user input detector 214 may determine the enable feedback signal based on EN_FB=det2 OR det3 or EN_FB=det2 AND det3. Alternatively, the user input detector 214 may enable the feedback signal in response to receiving an indication of a detected event from the peak detector 1010 and at least one of the zero-crossing detector 1020 or the force threshold detector 1030. For example, EN_FB may be determined at block 1040 based on EN_FB=det1 AND (det2 OR det3) or EN_FB=det1 AND det2 AND det3. This enables the computational complexity of the user input detector 214 to be traded with detection reliability.

The feedback enable signal may be provided for a predetermined duration, such as for example 10 ms or another preconfigured duration. It is however possible that the level of the enable signal is set based on simultaneous combination two or more of the detection indications (det1, det2, det3). For example, the detection circuitry 210 may be configured to trigger activation of the feedback signal in response top detecting press of the surface 102 (e.g. by peak detector 1010). The detection circuitry 210 may however cause the feedback circuitry 220 to deactivate the feedback signal in response to detecting release of the surface 102. (e.g. by the zero-crossing detector 1020 and/or the force threshold detector 1030). This enables to provide feedback to the user during the user input. This may be implemented for example by determining EN_FB based on EN_FB=det1 XOR det2. Alternatively, EN_FB may be determined by EN_FB=det1 XOR det3. The feedback enable signal may be also determined based on EN_FB=det1 XOR (det2 AND det3). This may improve reliability of release detection by considering both the zero-crossing (det2) and the force threshold (det3).

It is noted that the user input detector 214 may be implemented by analog circuitry such as derivator or integrator circuits, for example to generate the signals used for detection, and comparator circuits for performing the detections. Alternatively, or additionally, digital logic or processor circuitry with associated program code may be used to implement functionality of at least part of the user input detector 214.

Figure 11:
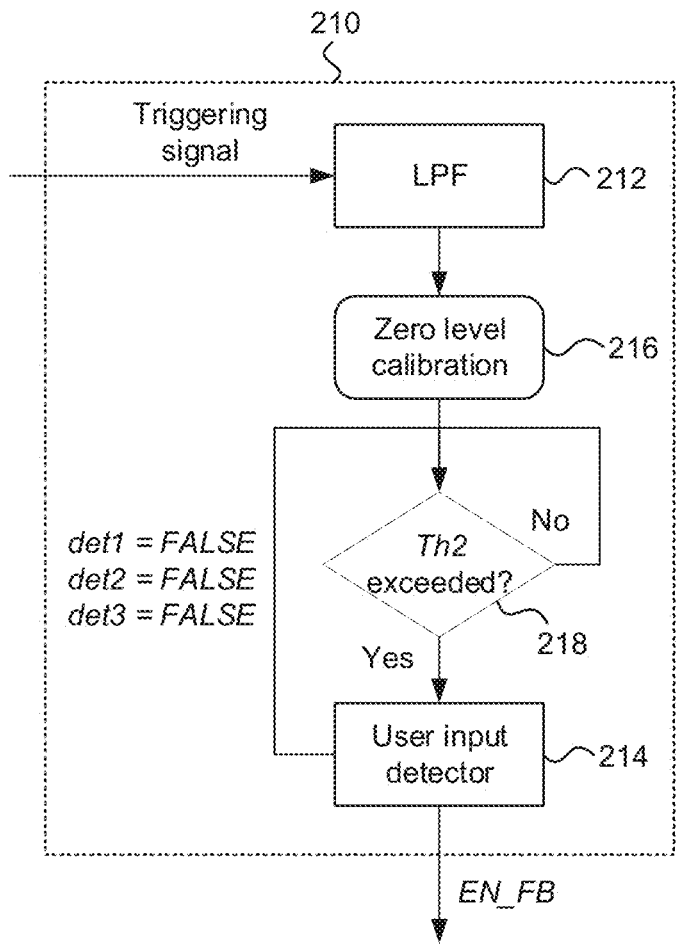
FIG. 11 illustrates an example of a block diagram of detection circuitry with zero-level calibration and a threshold for enabling user input detection, according to one or more example embodiments.

FIG. 11 illustrates an example of a block diagram of detection circuitry with zero-level calibration and a threshold for enabling user input detection, according to one or more example embodiments. The detection circuitry 210 may comprise the low-pass filter 212 and the user input detector 214. The detection circuitry may further comprise a zero level calibration block 216. The zero level calibration block 216 may be configured to calibrate a zero level of the triggering signal, for example based on an idle voltage of the first coil 112. The zero level calibration may for example comprise subtracting the idle voltage of the first coil 112 from the triggering signal. Calibration of the zero level may be useful for example when the user input detector 214 uses the integrated triggering signal for the force threshold detection (Th1). For example, calibrating the zero level before providing the triggering signal (u) to the integrator circuit 1032 ensures that the integrated force curve reaches its maximum at the point corresponding to the maximum force, thereby enabling the point of substantially maximum force to be detected based on the threshold (Th1).

Furthermore, the user input detection may be thresholded by block 218 such that the user input detector 214 is activated in response to detecting the (optionally zero level calibrated) triggering signal to exceed or reach a threshold (Th2). The detection circuitry 210 may therefore continue monitoring the level of the triggering signal after detection of the user input ("No" branch) and activate the user input detector 214 if the triggering signal again reaches or exceeds the threshold (Th2). This enables to avoid small variations around the zero level to cause detection of the user input to be activated. This also enables to reduce power consumption since the user input detector 241 may be activated only when it is likely that there is a user input to be detected. When the user input detector 214 is not activated, it may be caused to be in a low-power state. For example, in case of analog circuitry the system may prevent currents corresponding to the triggering signal to flow to the user detector circuitry. In case of digital processing, the operations performed by the user input detector 214 may be temporarily disabled, thereby reducing the power consumption. The threshold Th2 of block 218 may be lower, or in general have a lower absolute value, compared to the threshold Th1 of the force threshold detector 1030 (cf. block 1034).

In response to detecting a user input by the user input detector 214, for example as described with reference to FIG. 10, the detection circuitry 210 may re return to monitoring the level of the triggering signal at block 218. When returning to operation 218, the indication(s) of the user input detection(s) may be set to a level indicative of a logical FALSE. This enables a new detection round to be initiated independent of the previous detections by the user input detector 214.

Figure 12:
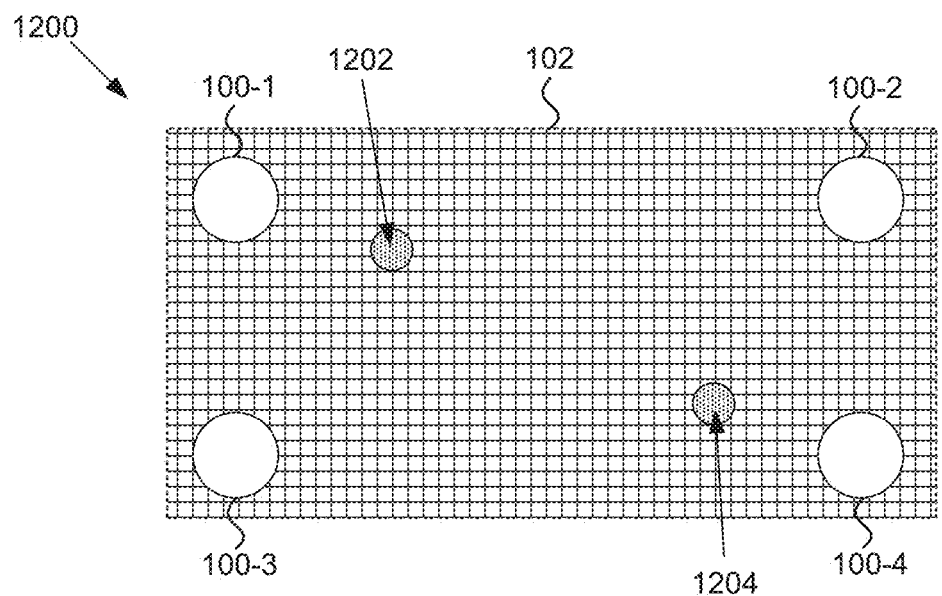
FIG. 12 illustrates an example of an apparatus comprising multiple surface audio devices, according to one or more example embodiments.

FIG. 12 illustrates an example of an apparatus comprising multiple surface audio devices, according to one or more example embodiments. The surface audio apparatus 1200 may comprise the surface 102 and a plurality of the surface audio devices 100 (100-1, 100-2, 100-3, 100-4), for example at corners of the surface 102. The surface audio devices 100-1, 100-2, 100-3, 100-4 may be coupled to the detection circuitry 210. For example, the detection circuitry 210 may be coupled to a plurality of the first coils 112 corresponding to the different surface audio devices 100-1, 100-2, 100-3, 100-4. Each surface audio device 100-1, 100-2, 100-3, 100-4 may generate a triggering signal, as described above, in response to movement of the surface 102 and the detection circuitry 210 may receive the triggering signals from the respective first coils 112. Therefore, a sense touch may comprise a sum of sense signals of the corner components. The detection circuitry 210 may then detect the user input on the surface 102 based on these triggering signals. For example, the detection circuitry 210 may trigger the feedback circuitry 220 to activate the feedback signal in response to detecting a user input based on at least one of the triggering signals. For example, if at least one of the triggering signals fulfils condition(s) of detecting a user input, the detection circuitry may provide the feedback enable signal (EN_FB) to the feedback circuitry 220. Alternatively, the user input may be detected in response to detecting a combination of the triggering signals to fulfil condition(s) of user input, for example if each of the triggering signals fulfils the condition(s). The feedback circuitry 220 may be therefore configured to activate the feedback signal for the second coils 122 of the surface audio devices 100-1, 100-2, 100-3, 100-4 in response to the detection of the user input by the detection circuitry. The same feedback signal may be provided to the different surface audio devices 100-1, 100-2, 100-3, 100-4. Hence, a plurality of identical feedback signals may be provided to the different surface audio devices 100-1, 100-2, 100-3, 100-4. Alternatively, the plurality of feedback signals provided to the different surface audio devices 100-1, 100-2, 100-3, 100-4 may be different.

It is further noted that pressing the surface 102 at different locations of the surface 102 may cause different triggering signals to be generated at the surface audio devices 100-1, 100-2, 100-3, 100-4. For example, pressing the surface 102 at location 1202 may cause a stronger triggering signal at the first coil 112 of the surface audio device 100-1 than at the first coil 112 of the surface audio device 100-4. It is therefore possible to estimate the location of the user input on the surface based on characteristics of the triggering signals. For example, the detection circuitry 210 may be configured to detect the location of the user input based on voltage or current levels induced at the first coils 112 of the different surface audio devices 100-1, 100-2, 100-3, 100-4. Different locations at the surface may be mapped to different user inputs, for example for adjusting different aspects of a system configured to be controlled by the surface audio device 1200.

The plurality of feedback signals provided to the coils 122 may be determined based on the location of the user input. For example, a stronger feedback signal may be provided to the surface audio device(s) (e.g. 100-1) that are relatively closer to the location of the user input. The strength of the feedback signal for a particular surface audio device may be therefore determined based on a distance of that surface audio device from the location of the user input. This enables to reduce power consumption since providing feedback by the surface audio device(s) (e.g. 100-4) located far from the user input may be avoided or attenuated.

Furthermore, even if the plurality of feedback signals were identical, the feedback signal may be determined based on the location of the user input. This enables to provide user input specific feedback. For example, by pressing the surface 102 at location 1202, the user may be provided with a first audio or haptic feedback by one or more of the surface audio devices 100-1, 100-2, 100-3, 100-4. However, a different audio or haptic feedback may be provided when the user presses the surface 102 at another location, for example location 1204. For example, if the surface audio device 1200 is configured to control volume of audio playback by the surface audio device 1200, the user may be enabled to increase the volume by pressing the surface on the left (relatively closer to surface audio devices 100-1 or 100-3) and to decrease the volume by pressing the surface on the right (relatively closer to surface audio devices 100-2 or 100-4). A different audio and/or haptic feedback may be then provided based on whether the user wishes to increase the volume (e.g. by pressing the surface at location 1202) or to decrease the volume (e.g. by pressing the surface at location 1204).

This may be implemented for example based on a mapping between the location of the user input at the surface 102 and at least one feedback signal. Such mapping may be stored at the surface audio device 1200, for example along with the haptic signal bank 224 or an audio signal bank. The surface 102 may be for example divided into a plurality of regions, each region being mapped to at least one feedback signal. It is noted that the regions of the surface 102 may be expressed at the memory of the surface audio device 1200 by corresponding threshold levels of the triggering signals rather than physical regions at the surface 102.

The mapping between the regions and the feedback signals may be configurable. For example, if the surface 102 comprises a touch screen, the user may be enabled to configure the feedback signals associated with different regions and/or different applications controllable by the user input. For example, a user input at the same location of the surface 102 may be configured to provide a different feedback depending on the application currently controllable by the surface audio device 1200. Alternatively, the mapping may be configurable by providing the mapping to the surface audio device 1200 by another device, for example over a wireless communication interface. In general, the surface audio device 1200 may receive an indication of the mapping between the location(s) of the user input at the surface 102 and the feedback signal(s).

It is noted that even though four surface audio devices 100-1, 100-2, 100-3, 100-4 are illustrated in FIG. 12, the surface audio device 1200 may in general have any number of the surface audio devices 100. In the simplest case of one surface audio device the panel (surface 102) may converge to be a button. Using more than one surface audio device 100 enables intermediate user inputs at locations between the surface audio devices 100 to be detected. The user may be also enabled to choose a use case (e.g. application) from the touch panel (surface 102) and thereby to configure the audio and/or haptic feedback setup. This enables to produce suitable audio and/or haptic feedback for a particular use case. Personalization of the audio and/or haptic feedback is thereby also enabled.

Figure 13:
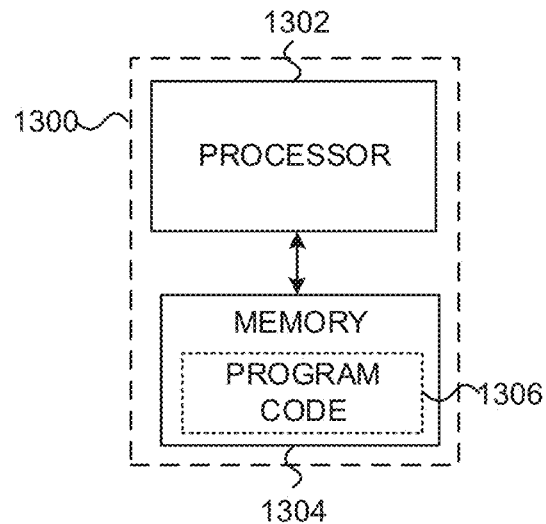
FIG. 13 illustrates an example of an apparatus configured to practice one or more example embodiments.

FIG. 13 illustrates an example of an apparatus configured to practice one or more example embodiments. The apparatus 1300 may comprise at least one processor 1302. The at least one processor 1302 may comprise, for example, one or more of various processing devices or processor circuitry, such as for example a co-processor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware (HW) accelerator, a special-purpose computer chip, or the like.

The apparatus 1300 may further comprise at least one memory 1304. The at least one memory 1304 may be configured to store, for example, computer program code or the like, for example operating system software and application software. The at least one memory 1304 may comprise one or more volatile memory devices, one or more non-volatile memory devices, and/or a combination thereof. For example, the at least one memory 1304 may be embodied as magnetic storage devices (such as hard disk drives, floppy disks, magnetic tapes, etc.), optical magnetic storage devices, or semiconductor memories (such as mask ROM, PROM (programmable ROM), EPROM (erasable PROM), flash ROM, RAM (random access memory), etc.).

Apparatus 1300 may further comprise a communication interface (not shown) configured to enable the apparatus to send and/or receive information, for example configuration information comprising a library or bank of feedback signal(s) or mappings between different user inputs (e.g. positions on a surface of a surface audio device) with different feedback signals. Alternatively, such information may be however preconfigured at the apparatus 1300. The communication interface may for example comprise a short-range wireless network connection (e.g. Bluetooth or Wi-Fi), or a cellular communication interface, for example according to the $3^{rd}$ generation partnership project (3GPP) specifications. The apparatus 1300 may further comprise a user interface (not shown). The user interface may comprise for example the surface 102.

When the apparatus 1300 is configured to implement some functionality, some component and/or components of the apparatus 1300, such as for example the at least one processor 1302 and/or the at least one memory 1304, may be configured to implement this functionality. Furthermore, when the at least one processor 1302 is configured to implement some functionality, this functionality may be implemented using the program code 1306 comprised, for example, in the at least one memory 1304.

The functionality described herein may be performed, at least in part, by one or more computer program product components such as software components. According to an embodiment, the apparatus comprises a processor or processor circuitry, such as for example a microcontroller, configured by the program code when executed to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), application-specific Integrated Circuits (ASICs), application-specific Standard Products (ASSPs), System-on-a-chip systems (SOCs), Complex Programmable Logic Devices (CPLDs), Graphics Processing Units (GPUs).

The apparatus 1300 comprises means for performing at least one example embodiment described herein. In one example, the means comprises the at least one processor 1302, the at least one memory 1304 including program code 1306 configured to, when executed by the at least one processor, cause the apparatus 1300 to perform the example embodiment(s). Alternatively, or additionally, the means may comprise one or more of the structural elements of the figures, for example the first and second coils 112, 122, or the like. Although apparatus 1300 is illustrated as a single device it is appreciated that, wherever applicable, functions of the apparatus 1300 may be distributed to a plurality of device, for example to implement example embodiments by means of distributed computing.

Figure 14:
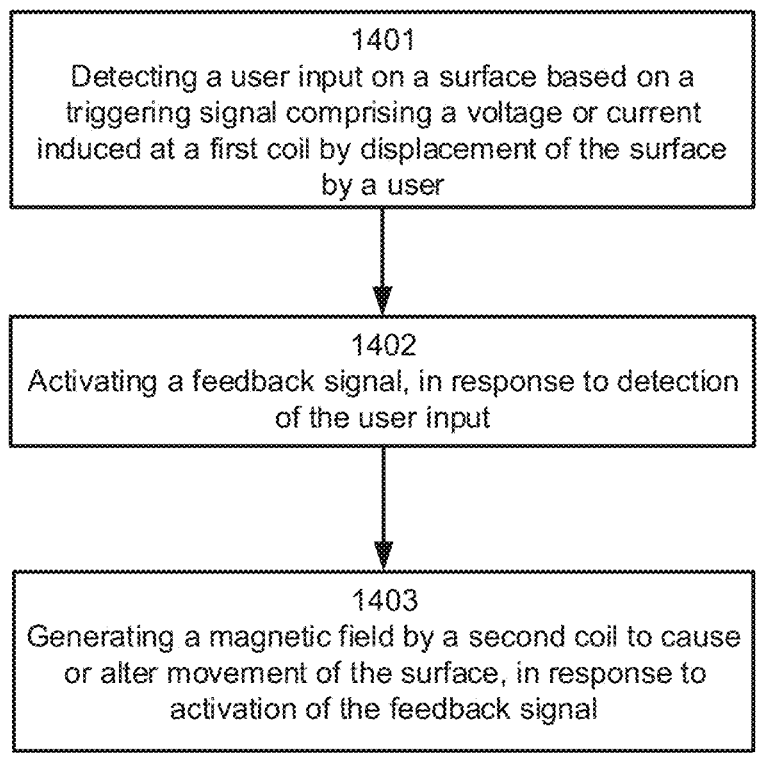
FIG. 14 illustrates an example of a method for providing haptic or audio feedback to a user, according to one or more example embodiments.

FIG. 14 illustrates an example of a method for providing audio or haptic feedback to a user, according to one or more example embodiments.

At 1401, the method may comprise detecting a user input on a surface based on a triggering signal comprising a voltage or current induced at a first coil by displacement of the surface by a user.

At 1402, the method may comprise activating a feedback signal in response to detection of the user input.

At 1403, the method may comprise generating a magnetic field by a second coil to cause or alter movement of the surface in response to activation of the feedback signal.

Further features of the method directly result for example from the functionalities and parameters of the devices 100, 200, 300, 400, 500, 1200, or 1300, as described in the appended claims and throughout the specification, and are therefore not repeated here. Different variations of the methods may be also applied, as described in connection with the various example embodiments.

An apparatus may be configured to perform or cause performance of any aspect of the methods described herein. Further, a computer program may comprise instructions for causing, when executed, an apparatus to perform any aspect of the methods described herein. Further, an apparatus may comprise means for performing any aspect of the method(s) described herein. According to an example embodiment, the means comprises at least one processor, and at least one memory including program code, the at least one processor, and program code configured to, when executed by the at least one processor, cause performance of any aspect of the method(s).

Any range or device value given herein may be extended or altered without losing the effect sought. Also, any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps or operations of the methods described herein may be carried out in any suitable order, or simultaneously where appropriate. Additionally, individual blocks may be deleted from any of the methods without departing from the scope of the subject matter described herein. Aspects of any of the embodiments described above may be combined with aspects of any of the other embodiments described to form further embodiments without losing the effect sought.

The term 'comprising' is used herein to mean including the method, blocks, or elements identified, but that such blocks or elements do not comprise an exclusive list and a method or apparatus may contain additional blocks or elements.

As used in this application, the term 'circuitry' may refer to one or more or of the following: (1) hardware-only circuit implementations (such as for example implementations in only analog and/or digital circuitry) and (2) combinations of hardware circuits and software, for example: (i) a combination of analog and/or digital hardware circuit(s) with software/firmware and (ii) any portions of hardware processor(s) with software (e.g. digital signal processor(s)), software, and memory(ies) that work together to cause an apparatus to perform the various example embodiments and (3) hardware circuit(s) and or processor(s), such as a microprocessor(s) or a portion of a microprocessor(s), that requires software (e.g., firmware) for operation, but the software may not be present when it is not needed for operation.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from scope of this specification.

The invention claimed is:

1. An apparatus, comprising:
   detection circuitry coupled to a first coil, wherein the detection circuitry is configured to detect a user input on a surface based on a triggering signal comprising voltage or current induced at the first coil by displacement of the surface by a user;
   a top portion comprising a first permanent magnet and a base portion comprising the first coil and a second coil, wherein the displacement of the surface by the user is configured to cause movement of the top portion towards the base portion, and wherein the displacement of the surface is configured to cause relative movement between the first permanent magnet and the first coil to induce the voltage or current at the first coil, wherein the base portion further comprises a magnetic element comprising a cavity for the first coil, the second coil, and at least one second permanent magnet, wherein the first coil and the second coil are configured to encircle the at least one second permanent magnet, and wherein the first coil and second coil are located between the magnetic element and the at least one second permanent magnet; and feedback circuitry coupled to the second coil, wherein the feedback circuitry is configured to activate a feedback signal, in response to detection of the user input by the detection circuitry, and wherein the second coil is configured to cause or alter movement of the surface based on a magnetic field configured to be generated by the second coil upon activation of the feedback signal.

2. The apparatus according to claim 1, wherein the at least one second permanent magnet is cylindrical.

3. The apparatus according to claim 1, wherein the first coil and the second coil are arranged at a same plane.

4. The apparatus according to claim 3, wherein a resistance of the first coil is between 22-26 ohms and wherein a length of a wire of the first coil is between 3.8-4.2 m.

5. The apparatus according to claim 1, wherein the feedback signal comprises a DC voltage or a DC current.

6. The apparatus according to claim 1, further comprising a low-pass filter configured to filter the triggering signal, wherein the low-pass filter is configured to pass haptic frequencies and suppress audio frequencies.

7. The apparatus according to claim 6, wherein a cut-off frequency of the low-pass filter is between 8-12 Hz.

8. The apparatus according to claim 1, wherein the detection circuitry is further configured to one or more of:
provide a first indication of the user input, in response to detecting a peak of the triggering signal; or
provide a second indication of the user input, in response to detecting a zero-crossing of the triggering signal after the peak of the triggering signal.

9. The apparatus according to claim 8, wherein the detection circuitry is further configured to:
derivate the triggering signal to obtain a derivative of the triggering signal; and
provide the first indication of the user input, in response to detecting the triggering signal to be above zero and the derivative of the triggering signal to be substantially equal to zero.

10. The apparatus according to claim 9, wherein the detection circuitry is further configured to:
integrate the triggering signal; and
provide a third indication of the user input, in response to detecting the integrated triggering signal to reach or exceed a first threshold and the triggering signal to be above zero.

11. The apparatus according to claim 10, wherein the detection circuitry is further configured to:
trigger the feedback circuitry to activate the feedback signal in response to at least one of: the first indication of the user input, the second indication of the user input, or the third indication of the user input.

12. The apparatus according to claim 1, wherein the detection circuitry is further configured to:
calibrate a zero level of the triggering signal based on an idle voltage of the first coil.

13. The apparatus according to claim 1, wherein the detection circuitry is further configured to:
activate detection of the user input, in response to detecting the triggering signal to reach or exceed a second threshold.

14. The apparatus according to claim 1, wherein the detection circuitry is coupled to a plurality of the first coils, and wherein the detection circuitry is further configured to detect the user input on the surface based on a plurality of triggering signals corresponding to the plurality of the first coils, and wherein the feedback circuitry is further configured to activate a plurality of the feedback signals for the plurality of the second coils, in response to the detection of the user input by the detection circuitry.

15. The apparatus according to claim 14, wherein the detection circuitry is further configured to detect a location of the user input at the surface based on voltage or current levels induced by the user input at the plurality of the first coils.

16. The apparatus according to claim 15, wherein the feedback circuitry is further configured to determine the plurality of the feedback signals based on the location of the user input at the surface.

17. The apparatus according to claim 16, wherein the feedback circuitry is further configured to determine the plurality of the feedback signals based on a mapping between the location of the user input at the surface and at least one feedback signal.

18. The apparatus according to claim 17, wherein the feedback circuitry is further configured to receive an indication of the mapping between the location of the user input at the surface and the at least one feedback signal.

19. The apparatus according to claim 14, wherein the plurality of the feedback signals is identical.

20. The apparatus according to claim 3, wherein the first coil and the second coil are arranged on top of the magnetic element.

* * * * *